United States Patent [19]

Hoshoya et al.

[11] Patent Number: 5,330,258
[45] Date of Patent: Jul. 19, 1994

[54] PRESSURE CONTROL UNIT FOR BRAKE SYSTEM

[75] Inventors: Yukio Hoshoya; Kei Fukuyo, both of Shizuoka, Japan

[73] Assignee: Nissinbo Industries, Inc., Tokyo, Japan

[21] Appl. No.: 989,437

[22] Filed: Dec. 11, 1992

[30] Foreign Application Priority Data

Dec. 13, 1991 [JP] Japan .................. 3-351204
Dec. 13, 1991 [JP] Japan .................. 3-351205

[51] Int. Cl.$^5$ .............................. B60T 8/32
[52] U.S. Cl. .................. 303/113.2; 303/111;
 303/116.2; 303/117.1; 303/119.1; 303/115.4
[58] Field of Search ............... 303/113.2, 113.3, 113.5,
 303/115.1, 115.4, 115.5, 111, 116.1, 116.2,
 116.3, 113.1, 116.4, 117.1, 119.1, 900, 901,
 10-12

[56] References Cited

U.S. PATENT DOCUMENTS

| | | | |
|---|---|---|---|
| 4,618,189 | 10/1986 | Nakanishi et al. | 303/115.4 |
| 4,703,979 | 11/1987 | Nakanishi et al. | 303/115.4 X |
| 5,165,764 | 11/1992 | Miyake et al. | 303/113.2 |
| 5,213,399 | 5/1993 | Burgdorf et al. | 303/116.2 X |

FOREIGN PATENT DOCUMENTS

| | | | |
|---|---|---|---|
| 0453900 | 10/1991 | European Pat. Off. | 303/116.1 |
| 2219055 | 11/1989 | United Kingdom | 303/115.4 |

Primary Examiner—Douglas C. Butler
Attorney, Agent, or Firm—Nikaido, Marmelstein Murray & Oram

[57] ABSTRACT

The present invention is directed to a pressure control unit for a brake system that includes a master cylinder connected to brake circuits for a plurality of drive and follower wheels, each brake circuit being connected to a wheel cylinder through a main brake line. The pressure control unit for each of the drive wheels incorporates a selector valve, fitted in the main brake line on a master cylinder side of a connection between the main brake line and the delivery line, the selector valve being formed to switch to a closed state only during traction control operation; a reflux line which connects a master cylinder reservoir and the suction line; a switching valve installed in the reflux line, the switching valve being formed to switch to a free passage state between a master cylinder reservoir and the suction line during traction control operation; a relief valve, fitted across both the main brake line and the reflux line, wherein when the pressure from the delivery line reaches or exceeds a threshold level, the relief valve opens to exhaust excess hydraulic pressure of the delivery line to the reflux line, and at all other times the relief valve remains closed; and a check valve connected to the suction line on a working fluid reservoir side of a connection with the reflux line.

18 Claims, 10 Drawing Sheets

PRESSURE CONTROL UNIT FOR BRAKE SYSTEM

SUMMARY OF DISCLOSURE

This invention relates to a pressure control unit for a brake circuit, in which the said unit has two functions: an antilock control function to prevent the wheels from locking when applying the brakes on a vehicle, and a traction control function to prevent slipping of the drive wheels when accelerating from a start or at higher speeds.

BACKGROUND TO INVENTION

Vehicles equipped with an antilock braking system (antilock control function or ABS) and a traction control system (TCS) employ a pressure control unit. Such a device has been disclosed in the Publication of Unexamined Japanese Patent Application Number 57-22948.

That device uses an ABS hydraulic circuit as the basic circuit, wherein a control valve, which operates as a function of the operation of the master cylinder, is installed in the return pathway of the basic circuit, and a pump piston for the traction control system is added to the ABS hydraulic pump. When the master cylinder is activated, this control valve enables passage between a switching valve, switchable between supply or exhaust positions, and the hydraulic fluid reservoir, and when the master cylinder is not operating, then the control valve blocks this passage between the said switching valve and the reservoir, and at the same time links the said supply or exhaust switching valve and the delivery line of the hydraulic pump. As well, hydraulic fluid for both ABS and TCS operation is derived in common from the hydraulic pump; when the TCS is in operation, hydraulic pressure is supplied from the hydraulic pump through the return line of the ABS hydraulic circuit to the appropriate wheel cylinder via the supply-exhaust switching valve.

The pressure control unit as disclosed in that patent has the following problematic points.

(1) The hydraulic pump requires pump pistons for both the ABS and the TCS functions, moreover a 2-position-3-way selector valve is required which means that the device is very complex and therefore expensive.

(2) During operation of the TCS, both the supply of hydraulic pressure from the hydraulic pump to the wheel cylinder and the exhausting of the pressure from the wheel cylinder to the reservoir must proceed through at least two valves including the control valve and the supply-exhaust valve; this mechanism is complex and the overall response of the system is poor.

(3) When pressure is being reduced during operation of the TCS, the hydraulic fluid in the wheel cylinder circulates back to the master cylinder reservoir via the master cylinder channel and the master cylinder. This passage of the hydraulic fluid inside the master cylinder can easily damage the cylinder cup.

OBJECTIVES OF THE INVENTION

The objective of this invention is to provide a brake pressure control unit which will resolve all of the problems as discussed previously.

Another objective of this invention is to produce a brake pressure control unit which can provide a TCS function of high performance and reliability through the addition only of inexpensive and a small number of parts to the basic ABS circuit.

A further objective of this invention is to provide a brake pressure control unit which will improve the response of the hydraulic pressure control during TCS operation by having the hydraulic fluid from the hydraulic pump and wheel cylinder supplied and exhausted through a supply-exhaust switching valve only.

A further objective of this invention is to provide a brake pressure control unit which has fewer parts and a simpler mechanism of operation by providing a dual-purpose hydraulic pump for both ABS use and TCS use.

A further objective of this invention is to provide a brake pressure control unit which will not damage the cylinder cup inside the master cylinder; wherein during TCS operation, to increase the pressure the hydraulic fluid will be sucked in from the master cylinder reservoir, and to decrease the pressure the exhausted fluid will circulate back to the master cylinder reservoir, through a reflux line rather than through the master cylinder.

A still further objective of this invention is to provide a brake pressure control unit of simplified structure with reduced manufacturing cost by using an inexpensive 2-position-2-way selector valve rather than a 2-position-3-way selector valve.

RETAILED DESCRIPTION OF THE PREFERRED EMBODIMENTS

EXAMPLE 1

A. Basic Circuit

Figure 1:
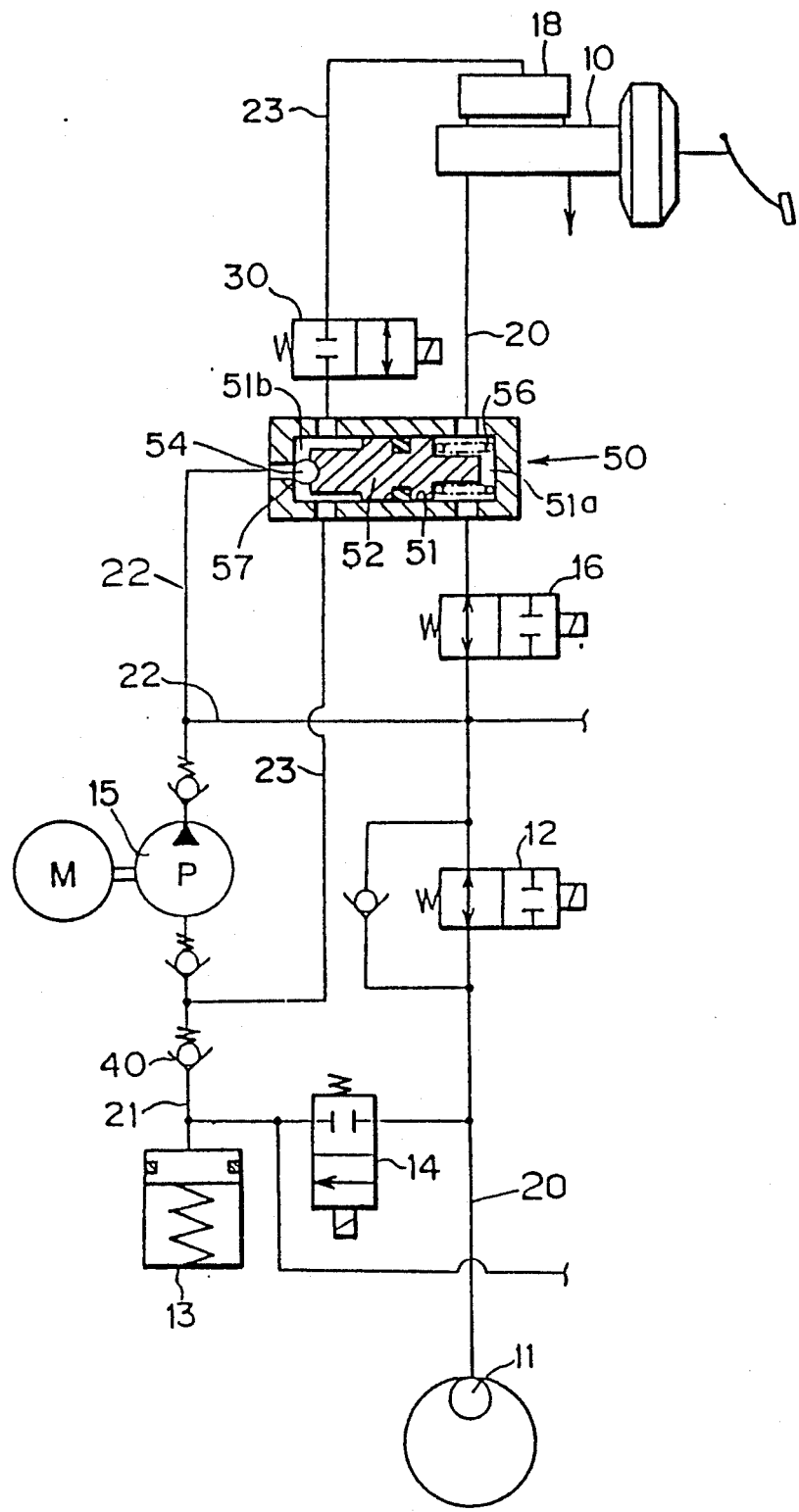
FIG. 1 is a partial block diagram of the pressure control unit of this invention as embodied in Example 1.

FIG. 1 shows the hydraulic brake circuit of an automobile in which a portion of the said circuit has been omitted.

The pressure control unit of this invention is designed with the publicly-disclosed ABS hydraulic circuit, noted above, as the basic circuit.

The noted ABS hydraulic circuit includes the main brake lines I and II (20) which link the master cylinder 10 to each wheel cylinder 11, a normally open inlet valve 12 which opens or closes passage through the main brake line 20, a reservoir 13 which can store the working fluid, a normally closed outlet valve 14 which opens and closes passage between the main brake line 20 and the reservoir 13, a hydraulic pump 15 which is activated during ABS operation, a suction line 21 which links the suction side of the hydraulic pump 15 with the reservoir 13, and a delivery line 22 which links the delivery side of the hydraulic pump 15 with the main brake line 20.

The master cylinder is connected to the wheel cylinder of each of the four wheels by either Brake Circuit I, a front and rear brake circuit split, or Brake Circuit II, a diagonal brake circuit split.

The pressure control unit of this invention is based on the ABS hydraulic circuit as described above, with the additional installation of a selector valve 16, a reflux line 23, a switching valve 30, a relief valve 50, and a check valve 40 in the drive wheel brake circuit.

B. Selector Valve

The selector valve 16, comprised of a 2-position-2-way selector valve, is fitted in the main brake line 20 on the master cylinder 10 side of the connection with the delivery line 22.

This selector valve 16 switches operation between the ABS and TCS and functions to open or close the main brake line; more specifically, the valve remains open at all times, except when the TCS is activated, at which time it closes to block off passage to the main brake line 20.

C. Reflux Line

The reflux line 23 links the master cylinder reservoir 18 and the suction line 21, and serves to recover and send any excess brake fluid generated in the hydraulic circuits to the said master cylinder reservoir 18.

D. Switching Valve

The switching valve 30 is comprised of a normally closed 2-position-2-way selector valve, and is installed in the reflux line 23 between the relief valve 50 and the master cylinder reservoir 18. This valve remains closed during normal braking operation or during ABS operation, but opens when the TCS system is activated.

E. Relief Valve

The relief valve 50, which opens or closes off passage through the lines with hydraulic force, is basically fitted across both the main brake line 20 and the reflux line 23; but is also connected to the delivery line 22.

This relief valve 50 functions to constantly keep the main brake line 20 and the reflux line 23 open, thereby avoiding a buildup of resistance to transmission of the hydraulic fluid.

Normally, the relief valve 50 blocks passage between the delivery line 22 and the reflux line 23; but when the hydraulic pump 15 is operational during operation of the TCS and the hydraulic pressure delivered from the pump exceeds a threshold value, then the relief valve 50 opens to exhaust the excess hydraulic fluid to the master cylinder reservoir 18 via the reflux line 23. This function serves to prevent excessive hydraulic pressure in the delivery line 22 and that portion of the main brake line connected to the delivery line 22.

Figure 2:
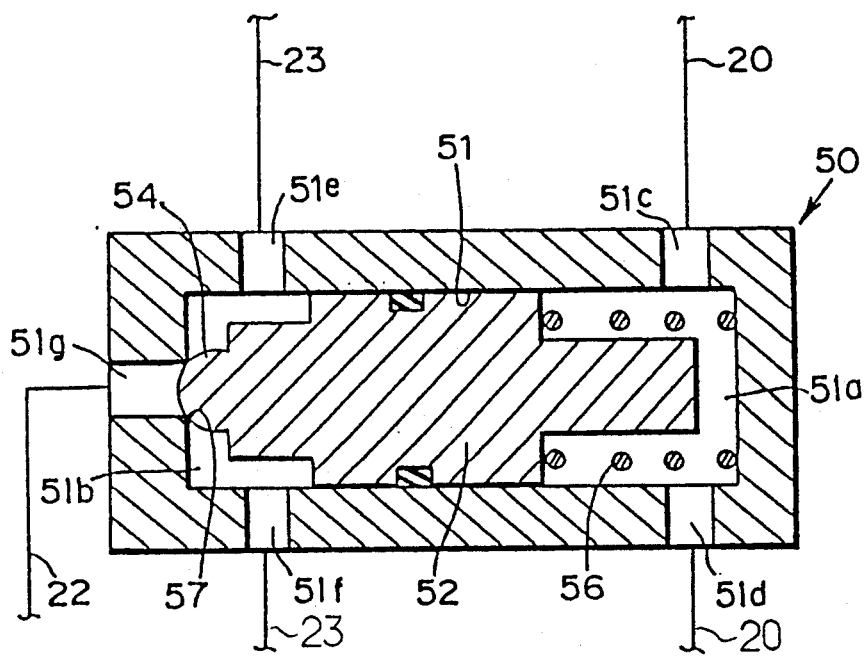
FIG. 2 is an enlarged cross section diagram of the relief valve shown in FIG. 1.

The configuration of the relief valve 50 can be understood from an examination of FIG. 2. This valve includes one piston 52 and spring 56. Piston 52 is housed in such a manner to slide back and forth inside cylinder 51, which has two independent chambers 51a and 51b molded on either end of the piston for the piston strokes. Spring 56, housed within chamber 51a, constantly pushes piston 52 in the direction to compress chamber 51b.

Hydraulic fluid ports 51c–51g are built into chambers 51a or 51b, to enable passage through lines 20, 22, or 23 respectively as shown in the diagram.

A valve head 54 is molded onto that end of piston 52 positioned within chamber 51b, and a valve seat 57 is molded on port 51g at the entrance to chamber 51b. Together, valve head 54 and valve seat 57 comprise a normally closed valve arrangement.

This valve arrangement operates in such a manner that when chamber 51a is non-pressurized, and the force of the hydraulic fluid from delivery line 22 pushing on valve head 54 exceeds the spring force of spring 56, the line will open; on the other hand, if chamber 51a is pressurized (that is, during normal braking operation or when ABS is operational), then the valve remains closed.

Thus, the relief valve arrangement of this invention has the following advantages in comparison with the conventional relief valve arrangement in the public domain.

A trial of the noted relief valve arrangement reveals that during normal braking operation or when ABS is operational, the hydraulic fluid of the delivery line 22 flows out to the reflux line 23. To prevent this phenomenon, an additional selector valve has to be installed on the delivery line 22 to block that line.

In the configuration of this invention, the single relief valve 50 serves the dual purpose of the relief function and the selector valve of the publicly disclosed configuration, in which case the selector valve of the said disclosed unit could be eliminated to effectively reduce the number of parts.

F. Check Valve

Check valve 40, installed in suction line 21 on the reservoir 13 side of the connection with the reflux line 23, allows the hydraulic fluid to flow from reservoir 13 towards the hydraulic pump and also allows the hydraulic fluid to branch from the suction line 21 and flow towards the reflux line 23, but impedes any flow in the reverse direction.

G. Control Method of the Selector Valves

Inlet valve 12, outlet valve 14, selector valve 16, and switching valve 30 are each comprised of 2-position-2-way solenoid valves.

Inlet valve 12 and outlet valve 14 open and close the fluid lines through repeated energizing and de-energizing of the respective valve during ABS or TCS operation. Selector valve 16 is energized only during TCS operation to close the line, and switching valve 30 switches open only during TCS operation.

The switching of each valve is controlled by an electronic control unit, not shown in the diagrams, and the associated control software. The electronic control unit and its software is not a subject of this invention, and thus a detailed explanation of its actual configuration or structure is not required.

Operation

The operation of the pressure control unit is now explained based on FIG. 1.

During Periods of No Braking Action

FIG. 1 shows the state of the unit when the brake pedal connected to master cylinder 10 is virtually untouched.

In this state, the selector valve 16 and the inlet valve 12 are open, while the outlet valve 14 and the switching valve 30 are closed. At the relief valve 50, piston 52 is subjected to the force of spring 56 and the valve arrangement is closed. The hydraulic pump 15 is not operating.

In this state, no braking force is generated at the wheel cylinder 11.

During Normal Braking Operation

During normal braking operation, defined as the period when the brake pedal is pushed but without any tendency for the wheels to lock, the selector valve 16 and the inlet valve 12 remain open, the outlet valve 14 and the switching valve 30 remain closed, and the hydraulic pump 15 is not operating. The pressure generated by the master cylinder 10 is transmitted through the main brake line 20 and is supplied to each wheel cylinder via the relief valve 50, the selector valve 16, and the inlet valve 12 to brake the wheels. At this time, the hydraulic pressure of the master cylinder 10 acts equally on either side of the piston 52 inside the relief valve 50, but given the difference between the area of piston 52 on the chamber 51a side and the area of the valve head 54 which are subjected to this pressure, and the force of spring 56, the valve head 54 remains seated in the valve seat 57, whereupon the valve arrangement of relief valve 50 remains closed.

During ABS Operation

During ABS operation, the switching valve 30 remains closed, and the selector valve 16 remains open. The hydraulic pump 15 is activated upon receipt of the signal for ABS operation, and the inlet valve 12 and the outlet valve 14 open and close repeatedly to decrease, maintain, or increase pressure to the wheel cylinder 11 so that the wheel will not lock. The hydraulic pump 15, by means of the outlet valve 14, sucks in the fluid exhausted to the reservoir 13 from the wheel cylinder 11, then resupplies it to the main brake line 20.

During this time also, the delivery pressure of the hydraulic pump 15 is applied equally on both sides of the piston 52 inside the relief valve 50, but given the difference between the area of piston 52 on the chamber 51a side and the area of the valve head 54 which are subjected to this pressure, and the spring force of spring 56, the valve head 54 remains seated in the valve seat 57, whereupon the valve arrangement of the relief valve 50 remains closed.

During TCS Operation

During TCS operation, the selector valve 16 switches to the closed position, and at the same time the switching valve 30 converts to the open position. In this state, the hydraulic pump 15 is activated, whereupon it sucks in hydraulic fluid from the master cylinder reservoir 18 through the reflux line 23 and the suction line 21, then supplies it to the wheel cylinder 11 of the drive wheel via the delivery line 22 and the inlet valve 12 of the main brake line 20, thereby braking the wheel to suppress any acceleration slip of the drive wheel. Subsequently, the operations of the inlet valve 12 and outlet valve 14 are repeated to decrease, maintain, or increase pressure to the wheel cylinder 11 of the drive wheel, thereby controlling any acceleration slip of the drive wheel.

Since the selector valve 16 remains closed during TCS operation, the hydraulic fluid delivered from the hydraulic pump 15 does not flow through the main brake line 20 towards the non-pressurized master cylinder 10 side. Since no pressure is generated in the master cylinder 10, chamber 51a of relief valve 50 is non-pressurized, and only the spring force of spring 56 acting in the direction to close the valve is acting on piston 52.

Thus, the pressure of the delivery line 22 increases, and when the pressure pushing on valve head 54 of piston 52 exceeds the spring force of spring 56, piston 52 moves to the right, (the direction as manifested in the diagram), whereupon the valve arrangement temporarily opens and the pressure in the delivery line 22 is reduced. As this pressure continues to drop and the force pushing on valve head 54 becomes less than the force of spring 56, then piston 52 moves to the left, (the direction as manifested in the diagram), and the valve arrangement closes. This opening and closing action of relief valve 50 is repeated to adjust the pressure of the hydraulic fluid delivered from the hydraulic pump 15 to the threshold value. In the meantime, the excess hydraulic fluid exhausted from the outlet valve 14 is transmitted to the master cylinder reservoir 14 via reservoir 13, suction line 21, and reflux line 23.

EXAMPLE 2

Figure 3:
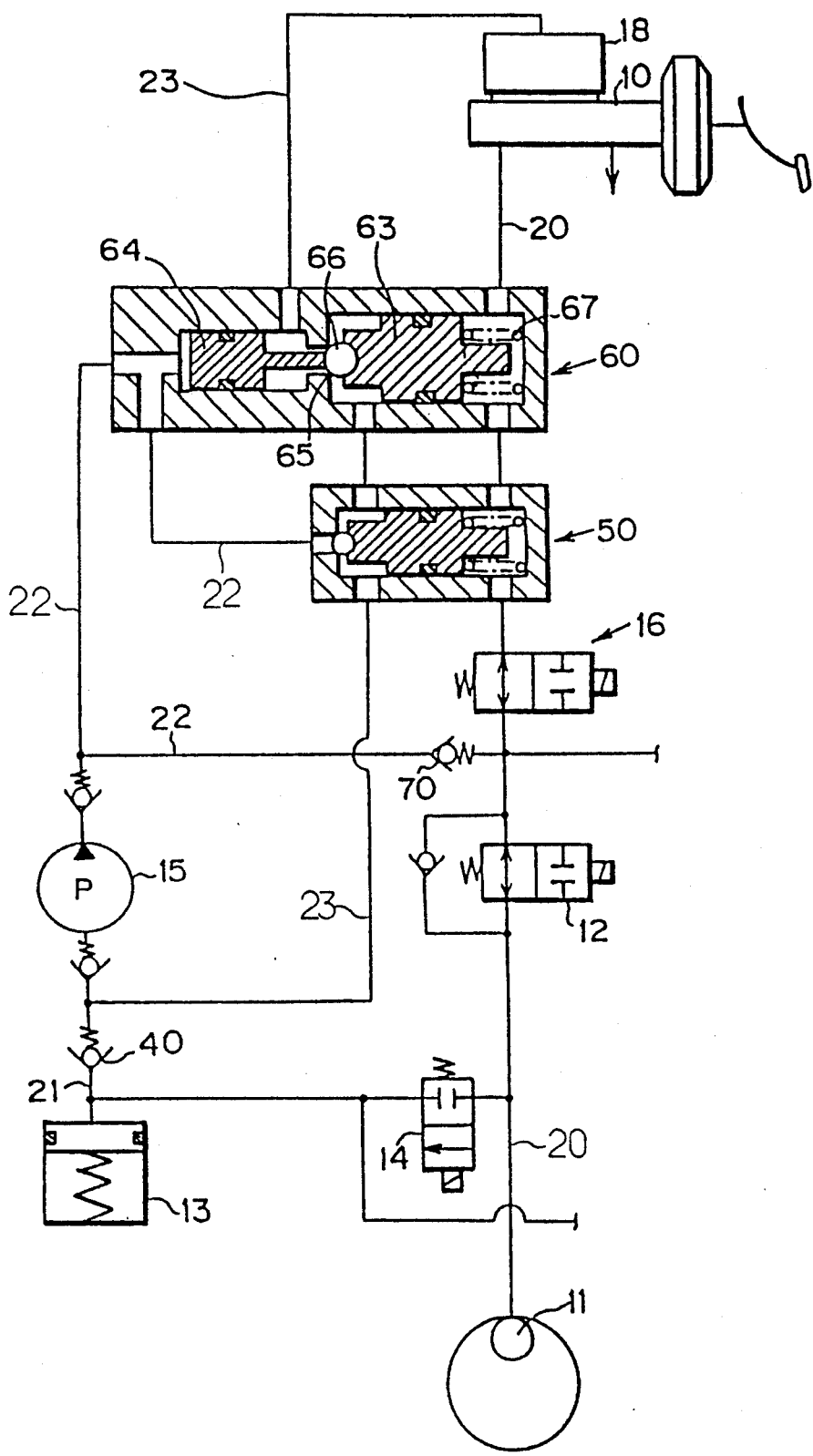
FIG. 3 is a partial block diagram of the pressure control unit of this invention as embodied in Example 2.
Figure 4:
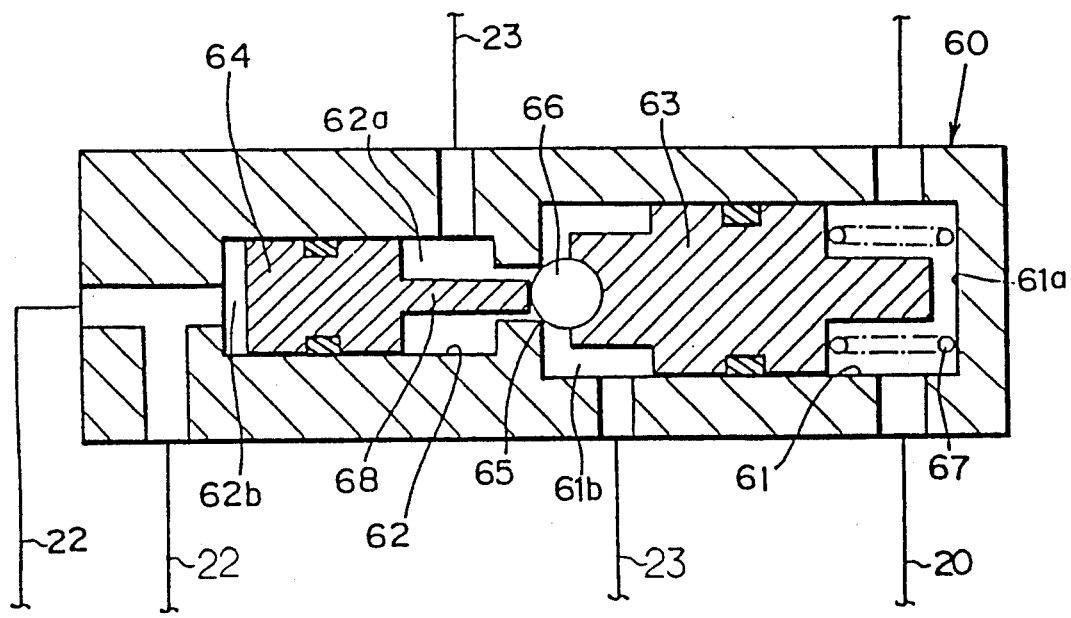
FIG. 4 is an enlarged cross section diagram of the switching valve shown in FIG. 3.

FIG. 3 and FIG. 4 show another example of this invention in which the solenoid-type switching valve 30 of Example 1 is replaced with a pressure-actuated valve, and a check valve 70 is added to the delivery line 22.

In the following explanation of this Example 2, those elements which have the same configuration as Example 1 are labeled with the same identifier number and detailed explanations thereof are omitted.

Configuration

The switching valve 60 is a pressure-actuated valve which is fitted in both the main brake line 20 and the reflux line 23.

FIG. 4 is an enlarged diagram of the switching valve 60, which is configured from two coaxial cylinders of different diameter, cylinder 1 61 and cylinder 2 62, piston 1 63 which is positioned to slide back and forth within cylinder 1 61, and piston 2 64 which is positioned to slide back and forth within cylinder 2 62. Piston 1 63 is designed such that the area subjected to pressure is larger than that area of piston 2. Valve seat 65 is molded on the cylinder 1 61 side of the connecting line which connects both cylinders 61 and 62. Chambers 61a and 61b are provided on each end of piston 1 63 for its stroking within cylinder 1 61; and chambers 62a and 62b are provided on each end of piston 2 64 for its stroking within cylinder 2 62. Valve head 66 is constructed on that end of piston 1 63 exposed to chamber 61b; said valve head 66 and the valve seat 65 described previously form the valve arrangement. Spring 67, contracted and set within chamber 61a, energizes piston 1 63 in the direction to close the valve. Push-rod 68 is molded on the chamber 62a side of piston 2 64, whereupon when piston 2 64 moves to the cylinder 1 61 side, this push-rod 68 functions to separate the valve head 66 from the valve seat 65.

As well, as shown in FIG. 3, a check valve 70 is fitted in the delivery line 22 between the hydraulic pump 15 and the main brake line 20; which permits the hydraulic fluid to flow only in the direction from the delivery line 22 to the main brake line 20. The threshold pressure to open check valve 70 is greater than the threshold pressure to open the valve arrangement of switching valve 60 when the main brake line 20 is non-pressurized.

Operation of the Switching Valve

During Periods When There is No Braking Action

In periods when there is no braking action, piston 1 63 is energized in the cylinder 2 62 direction by the force of spring 67, and the valve arrangement of switching valve 60 is closed as shown in FIG. 4.

During Normal Braking Action

During normal braking action as well, piston 1 63 is subjected to the master cylinder pressure generated in chamber 61a and the force of spring 67, thereby being energized in the direction to close the valve, as shown in FIG. 4. As well, the check valve 70, shown in FIG. 3, blocks the delivery line 22 such that the master cylinder 10 pressure will not act upon piston 2 64.

Accordingly, the valve arrangement of switching valve 60 remains closed.

During ABS Operation

During ABS operation, the delivery pressure of the pump acts upon piston 1 63 and piston 2 64. Since the area of piston 1 63 subject to pressure is larger than the said area of piston 2 64, the valve arrangement of switching valve 60 remains closed.

During TCS Operation

During TCS operation, the pressure of the master cylinder 10 is zero, hence no hydraulic pressure acts upon piston 1 63, while piston 2 64 is subject to the delivery pressure of the pump. Thus, until the check valve 70 opens, piston 2 64 and piston 1 63 move in unison in the direction to open the valve while overcoming the force of spring 67 causing the valve arrangement to open, whereupon a passage is created between the master cylinder reservoir 18 and the suction line 21 via the reflux line 23.

EXAMPLE 3

Figure 5:
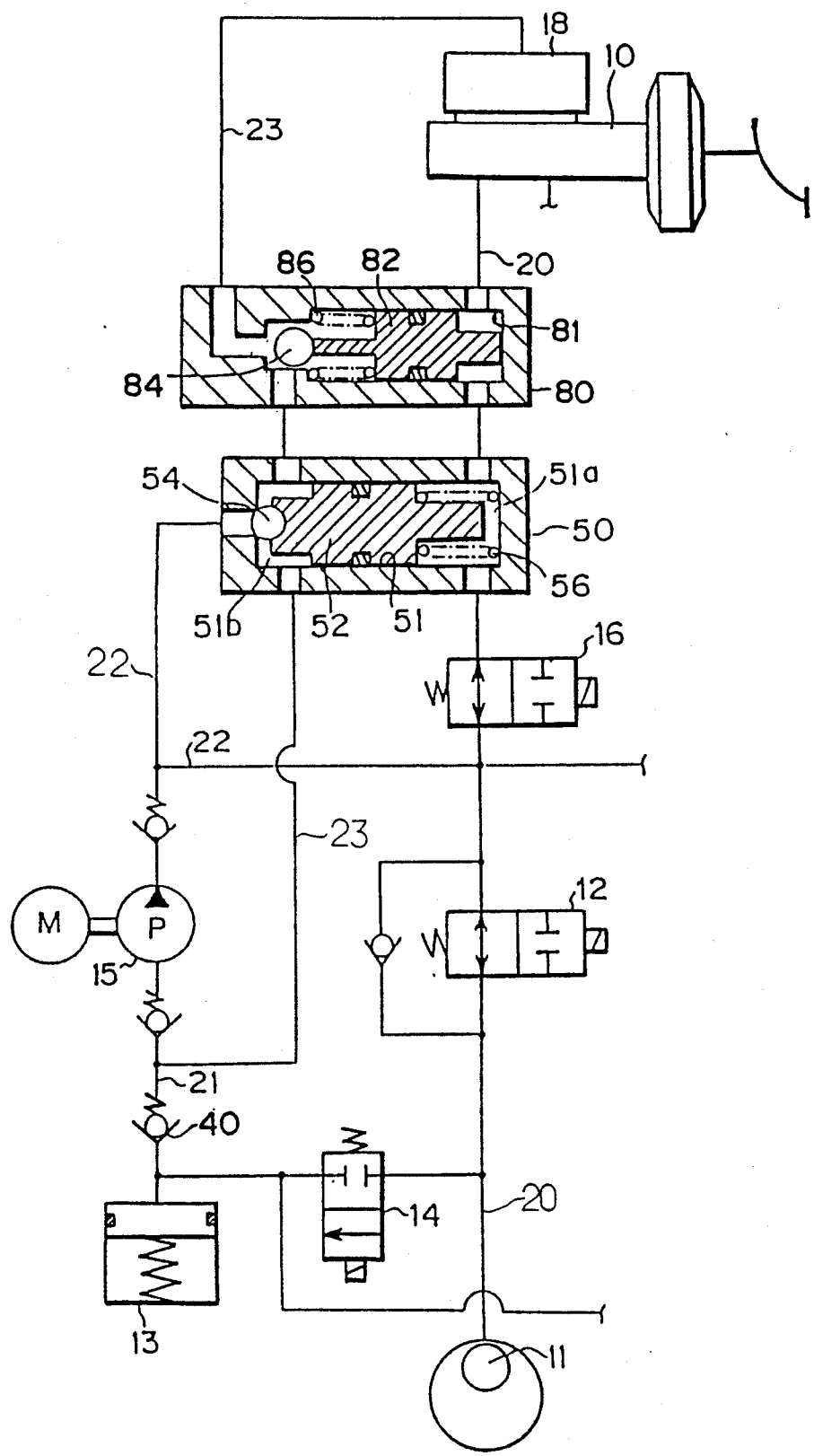
FIG. 5 is a partial block diagram of the pressure control unit of this invention as embodied in Example 3.
Figure 6:
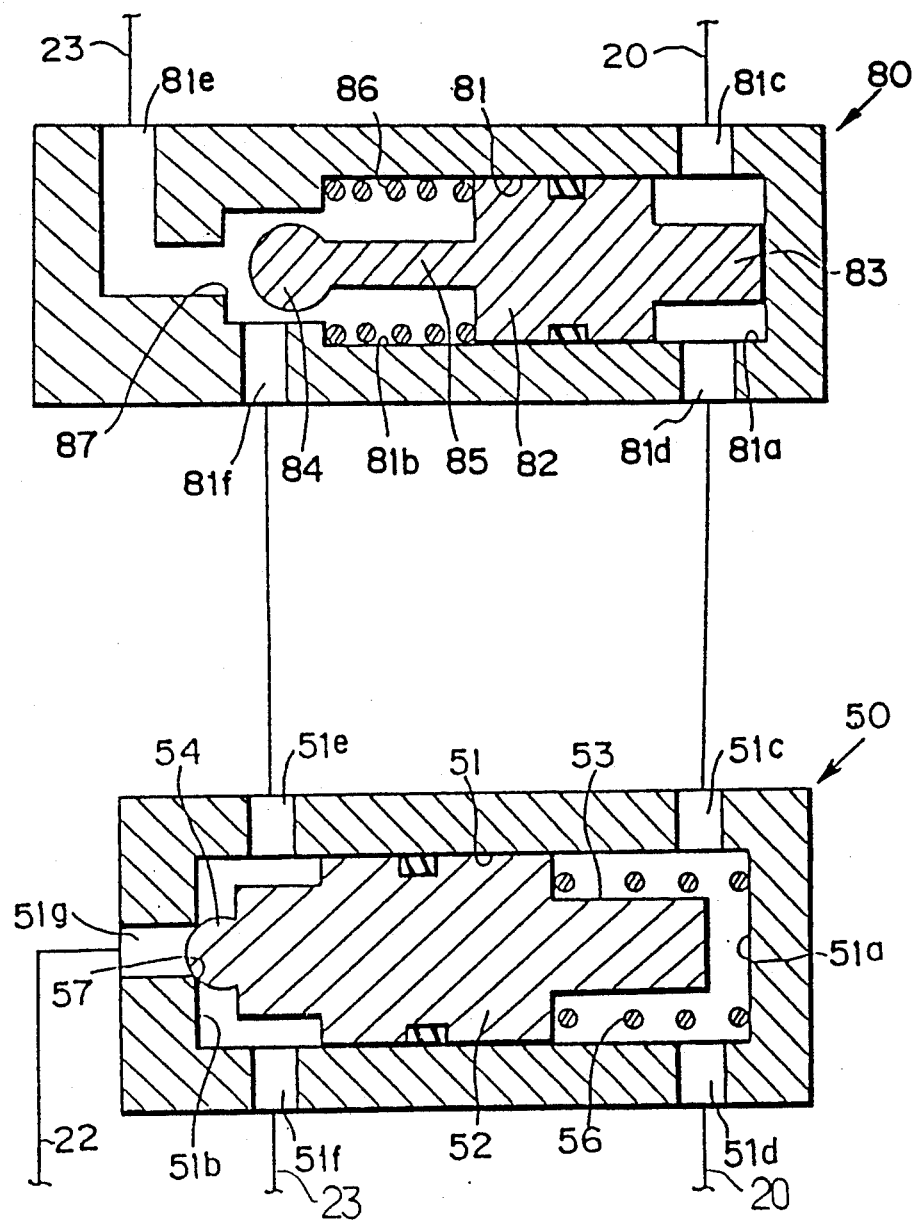
FIG. 6 is an enlarged cross section diagram of the relief valve shown in FIG. 5.

FIG. 5 and FIG. 6 show a example in which a normally open-type switching valve 80 is fitted in the main brake line 20 and the reflux line 23.

Configuration

Switching Valve

FIG. 6 shows enlarged cross section diagrams of the switching valve 80 and the relief valve 50.

The switching valve 80, fitted in the main brake line 20 and the reflux line 23, is subjected to the working pressure of master cylinder 10, and is a normally open pressure-actuated valve which closes off passage between the master cylinder reservoir 18 and the suction line 21. Piston 82 is housed in such a manner to slide back and forth inside cylinder 81; two independent chambers 81a and 81b are provided on either side of said piston 82 for stroking within cylinder 81. Stopper 83 is molded on that end of piston 82 positioned within chamber 81a, while push-rod 85 having a valve head 84 onto its terminus is molded onto that end of piston 82 positioned within chamber 81b.

Piston 82 is subjected to the force of spring 86, contracted and set within chamber 81b, and is constantly energized in the direction of chamber 81a. As well, hydraulic fluid ports 81c–81f are constructed within chambers 81a and 81b, wherein each of these ports is connected to line 20 or 23 as shown in the diagram. Valve seat 87 is molded onto that end of chamber 81b which is connected to port 81e. The normally open valve arrangement is configured from the valve head 84, described previously, and valve seat 87. When the force, generated by the hydraulic pressure of chamber 81a, pushing piston 82 in the direction of chamber 81b becomes greater than the force of spring 86 inside said chamber 81b, then piston 82 moves to the left, (the direction manifested in the diagram), thus closing the line.

Relief Valve

The relief valve 50, fitted across the main brake line 20 and the reflux line 23, is identical to the relief valve 50 described previously in Example 1 (see FIG. 2).

That is, relief valve 50 is comprised of a normally closed pressure-actuated valve which, on one side is subjected to the pressure of master cylinder 10 and on the other side is subjected to the pressure of delivery line 22; during TCS operation, the valve opens only when the pump delivery pressure exceeds the threshold value to exhaust that excess hydraulic pressure to the reflux line 23; otherwise the valve remains closed. Relief valve 50 is especially designed to function such that during TCS operation, hydraulic pressure from the hydraulic fluid delivered from the hydraulic pump 15, does not exceed the pressure required by the delivery line 22 and that portion of the main brake line 20 connected to the said delivery line 22.

Piston 52 is housed to slide back and forth within cylinder 51; two independent chambers 51a and 51b are provided on either side within cylinder 51 for motion of the said piston. Piston 52 is subjected to the force of spring 56, contracted and set within chamber 51a, and is constantly energized in the direction of chamber 51b. Valve head 54 is molded onto and projects on that end of piston 52 positioned within chamber 51b. As well, hydraulic fluid ports 51c–51g are built within chambers 51a and 51b, wherein each of these ports enable passage through line 20, 22, or 23 as shown in the diagram. Valve seat 57 is molded onto port 51g at the entrance to chamber 51b, and said valve seat 57 and valve head 54, described previously, comprise the normally closed valve arrangement. When chamber 51a is non-pressurized and the force of the hydraulic pressure of delivery line 22 pushing on valve head 54 exceeds the force of spring 50, the line opens, otherwise when chamber 51a is pressurized, the valve remains closed.

Normally, for a system which uses a relief valve which pushes the piston through a spring force only, a separate selector valve must be fitted in the delivery line 22 in order to prevent exhausting of the hydraulic fluid from the delivery line 22 to the reflux line 23 during normal braking action or during ABS operation. The relief valve mechanism of this invention can eliminate the use of this selector valve.

Operation

During Periods When There is No Braking Action

During periods when there is no braking action, the selector valve 16 and inlet valve 12 are open, while the outlet valve 14 is closed. Since no pressure is generated in the master cylinder 10, the piston 82 of switching valve 80 is energized by spring 86 and the valve arrangement is open. Piston 52 is subjected to the force of spring 56, and hence the valve arrangement of relief valve 50 is closed. During this time, hydraulic pump 15 is not operating.

During Normal Braking Action

During normal braking operation when the brake pedal is pushed but without any tendency for the wheels to lock, the selector valve 16 and the inlet valve 12 remain open, the outlet valve 14 remains closed, and the hydraulic pump 15 is not operating. The pressure generated by master cylinder 10 is transmitted through the brake line 20 and is supplied to wheel cylinder 11 via switching valve 80, relief valve 50, selector valve 16, and inlet valve 12 to start braking of the wheels. At this time, when the increasing fluid pressure of master cylinder 10 pushing on piston 82 exceeds the force of spring 86, the switching valve 80 moves to the left (the direction as manifested in the diagram) to close the valve arrangement.

During ABS Operation

During ABS operation, the selector valve 16 remains open, the switching valve 80 is closed as the valve arrangement is subjected to the hydraulic pressure from master cylinder 10, and the relief valve 50 remains closed since the area of piston 82 subject to the pressure from master cylinder 10 is larger than the area of valve head 54. Under these conditions, the inlet valve 12 and outlet valve 14 open and close repeatedly to decrease, maintain, or increase pressure to the wheel cylinder 11 so that the wheels will not lock. In the meantime, the hydraulic pump 15 sucks in the fluid exhausted to the reservoir 13 from the wheel cylinder 11 via the outlet valve 14, then resupplies it to the main brake line 20.

During TCS Operation

During TCS operation, the selector valve 16 switches to the closed state, and since no hydraulic pressure is generated at master cylinder 10, the switching valve 80 remains open. In this state, the hydraulic pump 15 is activated, whereupon it sucks in hydraulic fluid from the master cylinder reservoir 18 via the reflux line 23 and the suction line 21, then supplies it to the wheel cylinder 11 of the drive wheels via the delivery line 22 and the inlet valve 12 of the main brake line 20, thereby enabling normal brake action and suppressing any acceleration slip of the drive wheels. Subsequently, the operations of the inlet valve 12 and outlet valve 14 are repeated to decrease, maintain, or increase pressure to the wheel cylinder 11 of the drive wheels, thereby controlling any acceleration slip of the drive wheels.

Since the selector valve 16 remains closed during TCS operation, the hydraulic fluid delivered from the hydraulic pump 15 does not flow through the main brake line 20 towards the non-pressurized master cylinder 10. Since no pressure is generated in the master cylinder 10, chamber 51a of relief valve 50 is non-pressurized, and only the spring force of spring 56 is acting on piston 52 in the direction to close the valve. Thus, the pressure of the delivery line 22 increases, and when the pressure pushing on valve head 54 of piston 52 exceeds the spring force of spring 56, piston 52 moves to the right (the direction manifested in the diagram), whereupon the valve arrangement temporarily opens and the pressure in the delivery line 22 is reduced. As this pressure continues to drop and the force pushing on valve head 54 becomes less than the force of spring 56, then piston 52 moves to the left (the direction manifested in the diagram) and the valve arrangement closes. This opening and closing action of relief valve 50 is repeated to adjust the pressure of the hydraulic fluid delivered from hydraulic pump 15 to the threshold value. In the meantime, the excess hydraulic fluid exhausted from the outlet valve 14 is transmitted via reservoir 13 and suction line 21 to connect with the master cylinder reservoir 18 and reflux line 23 which is in the free passage state.

EXAMPLE 4

Figure 7:
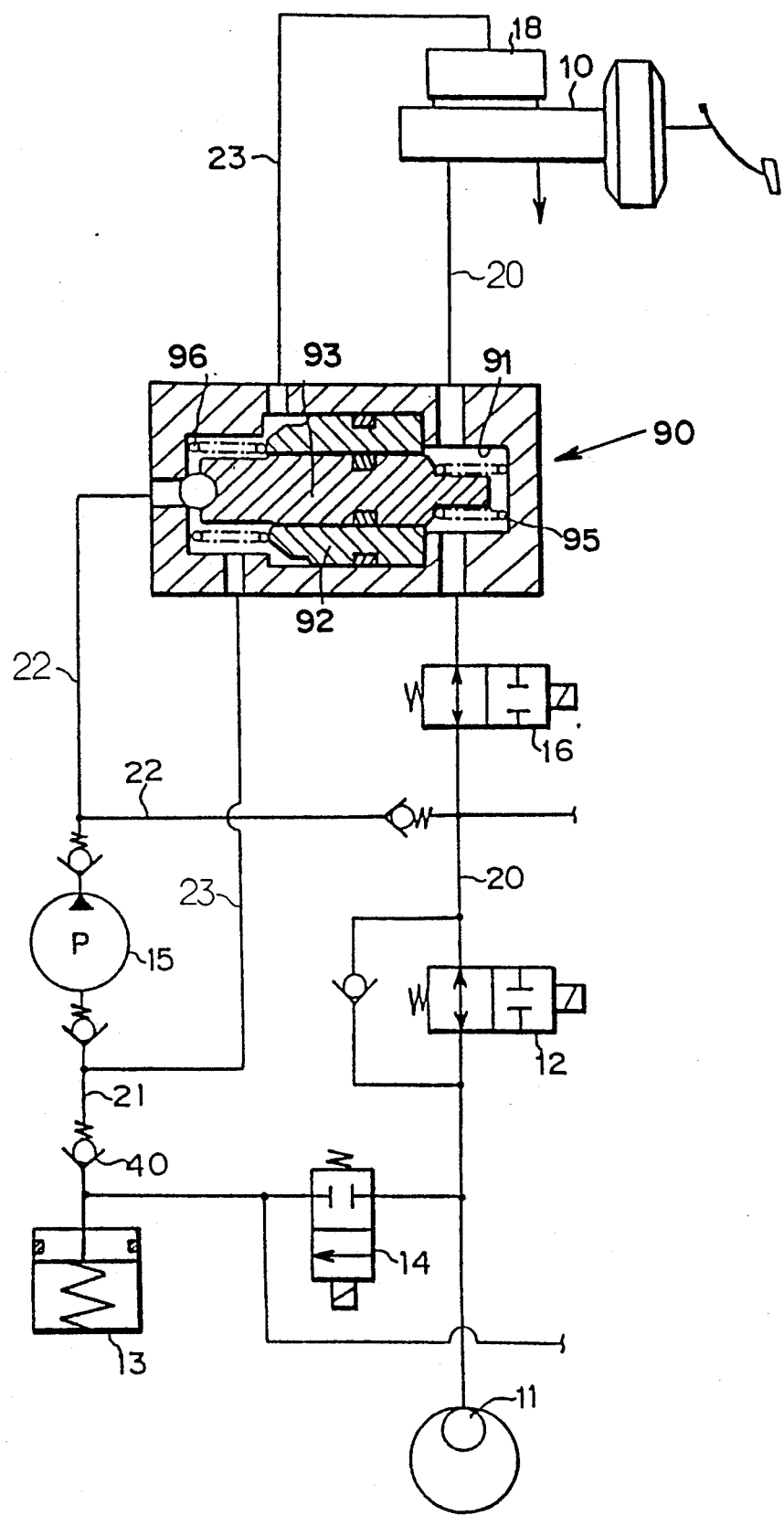
FIG. 7 is a partial block diagram of the pressure control unit of this invention as embodied in Example 4.
Figure 8:
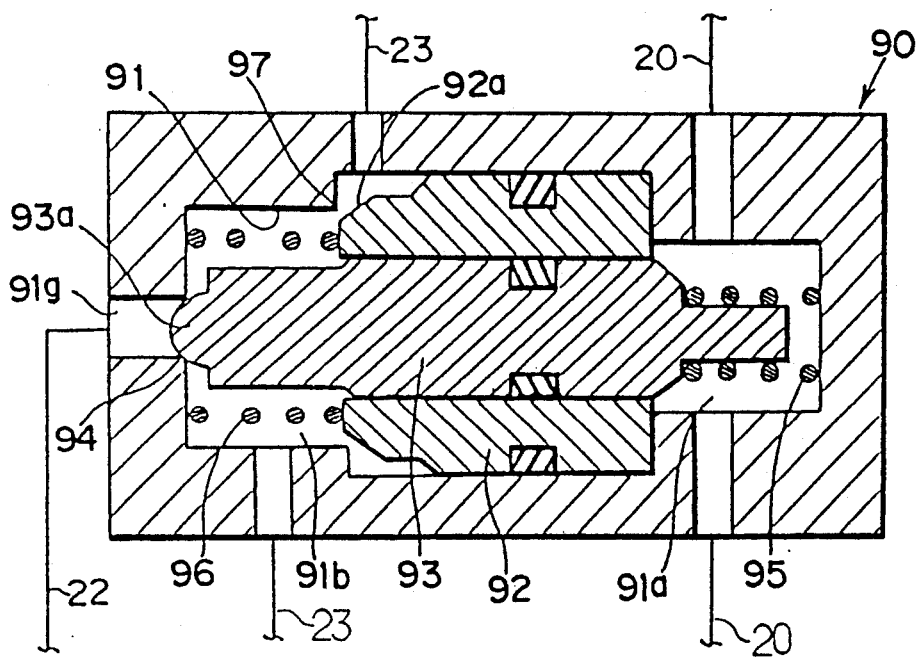
FIG. 8 is an enlarged cross section diagram of the valve unit which combines the switching valve function and relief valve function as shown in FIG. 7.

FIG. 7 and FIG. 8 illustrate another example of this invention in which a valve unit 90 is fitted across the main brake line 20 and the reflux line 23.

Configuration of Valve Unit

The valve unit 90 is a pressure-actuated valve in which the switching valve 80 and relief valve 50, both of which have been described previously, are integrated into one unit.

FIG. 8 is an enlarged cross section diagram of valve unit 90.

Valve unit 90 is configured from the variable-diameter cylinder 91, the switching valve ring piston 90 positioned to slide back and forth within cylinder 91, and the relief valve piston 93 inserted to slide back and forth in the shaft core of ring piston 92. Both pistons 92 and 93 are housed inside cylinder 91, wherein two chambers 91a and 91b are provided for the stroking of the two pistons. Valve arrangement 1 is configured from valve head 93a, molded on that end of piston 93 which is exposed in chamber 91b, and valve seat 94 molded onto the inlet of hydraulic fluid part 91g which faces valve head 93a. Spring 1 95, which energizes piston 93 in the direction to close the valve, is contracted and set in the other chamber 91a. As well, valve arrangement 2 is comprised of the gradient face 92a, a valve element molded onto that end of ring piston 92 which is exposed in chamber 91b, and valve seat 97 molded onto the offset portion of cylinder 91 which faces the said gradient face 92a. Spring 2 96 which energizes valve arrangement 2 in the direction to open the valve, is contracted and set between chamber 91b and ring piston 92. The return position of ring piston 92 is controlled as the rear end of the said ring piston strikes the offset face of cylinder 91.

Operation

The operation of ring piston 92 will be explained first.

During non-braking periods or during TCS operation, no pressure is generated in master cylinder 10, hence as shown in the diagram, ring piston 92 is energized by spring 2 96 and valve arrangement 2 is open, whereupon there is passage between the master cylinder reservoir 18 and the suction line 21.

During normal braking operation or during ABS operation, when the pressure of master cylinder 10 reaches or exceeds the threshold value, the ring piston 92 overcomes the force of spring 2 96 and moves to the left (the direction manifested in the diagram) to close valve arrangement 2, whereupon passage between master cylinder 18 and suction line 21 is blocked.

Next, the operation of piston 93 is explained.

During TCS operation, piston 93 overcomes the force of spring 1 95 and moves to the right (the direction manifested in the diagram) to open valve arrangement 1 only when the pressure of delivery line 22 reaches the threshold value, whereupon the excess hydraulic fluid is exhausted to the reflux line 23. At all other times, the valve is maintained in a closed state.

EXAMPLE 5

Figure 9:
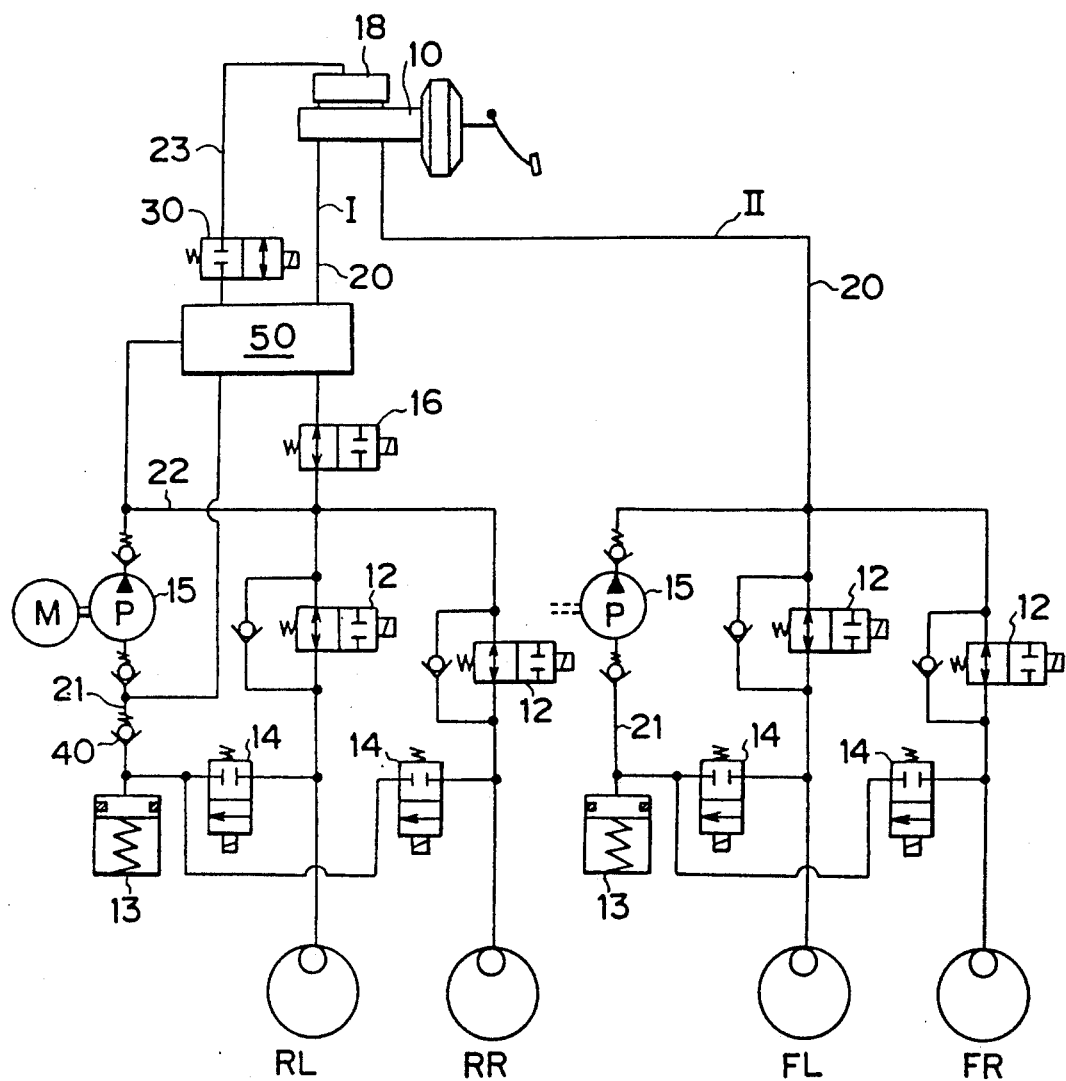
FIG. 9 is a diagram of a hydraulic pressure circuit split into front brake and rear brake circuits applicable to rear-wheel drive cars.

FIG. 9 is a circuit diagram of a brake pressure control unit for a rear-wheel drive car, in which the connections between the master cylinder 10 and the rear-left, rear-right, front-left, and front-right wheels are split into a front brake circuit and a rear brake circuit.

The rear-left and rear-right wheels are the drive wheels of the vehicle, while no drive force acts upon the front-left and front-right wheels.

The circuit comprised of the master cylinder 10 and the rear-left and rear-right drive wheels is known as brake circuit I, and the circuit comprised of the master cylinder 10 and the non-drive front-left and front-right wheels is known as brake circuit II.

The pressure control unit as explained previously in Example 1, is installed in brake circuit I which controls the rear-left and rear-right drive wheels.

The configuration and operation of brake circuit II which controls the master cylinder and the braking of the non-drive front-left and front-right wheels is the same as the publicly-disclosed circuit. Hence, those parts furnished in brake circuit II which are identical to those installed in brake circuit I are marked with the same identifier numbers, for which an explanation is omitted.

EXAMPLE 6

Figure 10:
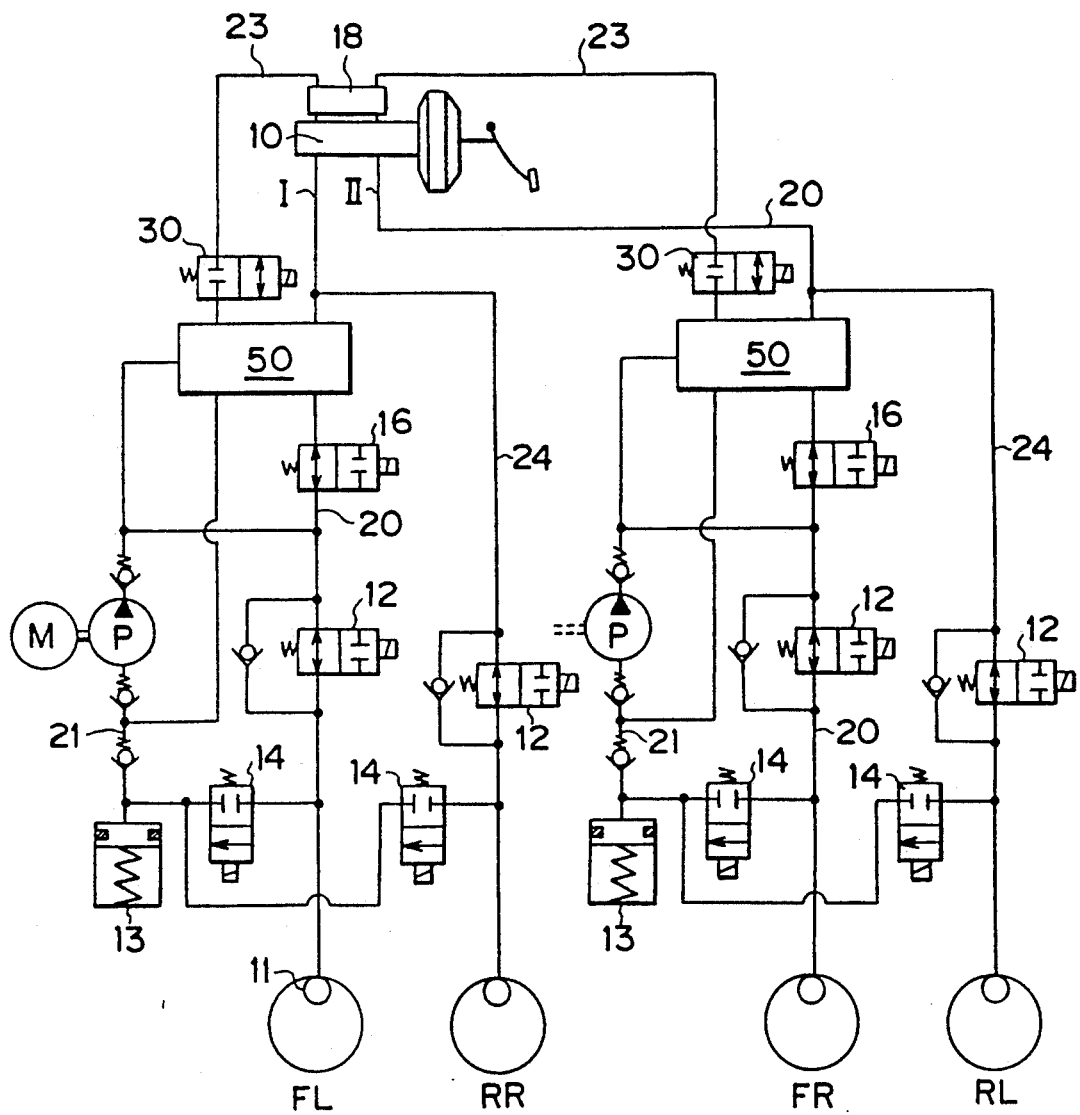
FIG. 10 is a diagram of a hydraulic pressure circuit split into diagonal brake circuits applicable to front-wheel drive cars.

FIG. 10 is a circuit diagram of a pressure control unit for a front-wheel drive vehicle, in which the connections between the master cylinder 10 and the rear-left, rear-right, front-left, and front-right wheels are split into two diagonal brake circuits.

The front-left and front-right wheels are the drive wheels of the vehicle, while no drive force is applied to the rear-left and rear-right wheels.

The circuit comprised of the master cylinder 10 and the front-left and rear-right wheels is known as brake circuit I, and the circuit comprised of the master cylinder 10 and the front-right and rear-left wheels is known as brake circuit II.

The pressure control unit as explained previously in Example 1 is installed in both brake circuit I and brake circuit II. In brake circuit I, it is preferred that the point at which line 24 branches from the main brake line 20 to travel to the non-drive rear-right wheel should be in the main brake line 20 between the master cylinder 10 and the selector valve 16.

In brake circuit II, the point at which line 24 branches from the main brake line 20 to travel to the non-drive rear-left wheel should be the same as for brake circuit I.

Those parts of FIG. 10 which have been explained previously are marked with the same identifier numbers, for which an explanation is omitted here.

We claim:

1. A pressure control unit for a brake system that includes a master cylinder connected to brake circuits for a plurality of drive and follower wheels, each brake circuit being connected to a wheel cylinder through a main brake line, and each brake circuit includes a normally open-type inlet valve installed in the main brake line to open or close passage to the main brake line, a normally closed-type outlet valve to open or close passage between the wheel cylinder and a working fluid reservoir, a suction line that connects a suction side of a hydraulic pump connected to the working fluid reservoir, and a delivery line that connects the hydraulic pump to the main brake line on a master cylinder side from the outlet valve, the pressure control unit for the drive wheels comprising:
 (a) a selector valve, fitted in the main brake line on the master cylinder side of a connection between the main brake line and the delivery line, said selector valve being formed to switch to a closed state only during traction control operation;
 (b) a reflux line which connects a master cylinder reservoir and the suction line;
 (c) a switching valve installed in said reflux line, said switching valve being formed to switch to a free passage state between the master cylinder reservoir and the suction line during traction control operation;
 (d) a relief valve, fitted across both the main brake line and said reflux line, wherein a first end of said relief valve is subject to pressure from the master cylinder, and a second end is subject to pressure from the delivery line,
 during traction control operation, when the pressure from the delivery line reaches or exceeds a threshold level, said relief valve opens to exhaust excess hydraulic pressure of the delivery line to said reflux line, and at all other times said relief valve remains closed; and
 (e) a check valve connected to the suction line on a working fluid reservoir side of a connection with said reflux line.

2. A pressure control unit as claimed in claim 1, wherein the relief valve is a pressure-actuated valve fitted across both the main brake line and the reflux line, said relief valve in all situations constantly maintains free passage in the main brake line and reflux line,
 during traction control, should the pressure of the delivery line reach or exceed a threshold value, said relief valve switches open to exhaust the excess hydraulic pressure of the delivery line to the reflux line, and at all other times, said relief valve remains closed.

3. A pressure control unit as claimed in claim 2, wherein the selector valve, the inlet valve, the outlet valve, and the switching valve are 2-position-2-way solenoid valves.

4. A pressure control unit as claimed in claim 1, wherein the selector valve, the inlet valve, the outlet valve, and the switching valve are 2-position-2-way solenoid valves.

5. A pressure control unit as claimed in claim 1, wherein the brake circuits connecting the master cylinder and the rear-left, rear-right, front-left, and front-right wheels are split into a front brake circuit and a rear brake circuit, and the pressure control unit is installed in the rear brake circuit which controls the rear-left and rear-right drive wheels.

6. A pressure control unit as claimed in claim 1, wherein the brake circuits connecting the master cylinder and the rear-left, rear-right, front-left, and front-right wheels are split into two diagonal brake circuits, and the pressure control unit is installed in each of the brake circuits so as to operate with braking the front-left and front-right drive wheels.

7. A pressure control unit for a brake system connected to an antilock brake circuit and a traction control system, the brake system including a master cylinder connected to brake circuits for a plurality of drive and follower wheels, each brake circuit being connected to a wheel cylinder through a main brake line, and each brake circuit includes a normally open-type inlet valve installed in the main brake line to open or close passage to the main brake line, a normally closed-type outlet valve to open or close passage between the wheel cylinder and a working fluid reservoir, a suction line that connects a suction side of a hydraulic pump connected to the working fluid reservoir, and a delivery line that connects the hydraulic pump to the main brake line on a master cylinder side from the outlet valve, the pressure control unit for the drive wheels comprising:
 (a) a selector valve, fitted in the main brake line on the master cylinder side of a connection of the main brake line and the delivery line, said selector valve being formed to switch to a closed state only during traction control operation;
 (b) a reflux line which connects the master cylinder reservoir and the suction line;

(c) a pressure-actuated switching valve connected across both the main brake line and said reflux line, wherein said switching valve in all situations allows free passage through the main brake line, but during non-braking or normal braking periods, and during operation of the antilock brake circuit, said switching valve closes the reflux line, and during operation of the traction control system, when pressure of the delivery line reaches or exceeds a threshold value, said switching valve opens said reflux line to enable free passage between the suction line and the master cylinder reservoir via the said reflux line;

(d) a relief valve, fitted across both the main brake line and said reflux line, wherein a first end of said relief valve is subject to pressure from the master cylinder, and a second end is subject to pressure from the delivery line, during traction control operation, when the pressure from the delivery line reaches or exceeds a threshold level, said relief valve opens to exhaust excess hydraulic pressure of the delivery line to said reflux line, and at all other times said relief valve remains closed;

(e) a first check valve connected to the suction line on a working fluid reservoir side of a connection with said reflux line; and (f) a second check valve connected to the delivery line which links the hydraulic pump and the main brake line, and which permits flow only from the delivery line to the main brake line.

8. A pressure control unit as claimed in claim 7, wherein under conditions where said switching valve is not subject to the hydraulic pressure from the main brake line, a threshold pressure to open said second check valve is greater than the threshold pressure to open said switching valve.

9. A pressure control unit as claimed in claim 8, wherein said switching valve includes first and second cylinders defined concentric with each other along a longitudinal centerline of said switching valve, a first piston housed inside the first cylinder, and a second piston housed inside the second cylinder, the first cylinder with the first piston having defined therebetween a main brake line chamber, which enables passage to the main brake line, and a first delivery chamber, which is subject to the pressure of the delivery line, the second cylinder with the second piston having defined therebetween a reflux chamber which enables passage to said reflux line, and a second delivery chamber which enables passage to the delivery line, the switching valve further including a valve head molded on an end face of the first piston in the first delivery chamber and positioned with a valve seat formed so as to seat along a pathway which enables passage between the first delivery chamber and the reflux chamber and a spring contracted and set within the main brake line chamber so as to urge the first piston to close the passage between the first delivery chamber and the reflux chamber, and during non-braking periods or normal braking action, and during operation of the antilock brake circuit, said switching valve is positioned to close off said reflux line, and during traction control operation, when the pressure of the delivery line reaches or exceeds the threshold value, said switching valve converts to an open state, whereby passage is enabled between the suction line and the master cylinder reservoir via said reflux line.

10. A pressure control unit as claimed in claim 7, wherein said switching valve includes first and second cylinders defined concentric with each other along a longitudinal centerline of said switching valve, a first piston housed inside the first cylinder, and a second piston housed inside the second cylinder, the first cylinder with the first piston having defined therebetween a main brake line chamber, which enables passage to the main brake line, and a first delivery chamber which is subject to the pressure of the delivery line, the second cylinder with the second piston having defined therebetween a reflux chamber which enables passage to said reflux line, and a second delivery chamber which enables passage to the delivery line, the switching valve further including a valve head molded on an end face of the first piston in the first delivery chamber and positioned with a valve seat formed so as to seat along a pathway which enables passage between the first delivery chamber and the reflux chamber and a spring contracted and set within the main brake line chamber so as to urge the first piston to close the passage between the first delivery chamber and the delivery chamber, and during non-braking periods or normal braking action, and during operation of the antilock brake circuit, said switching valve is positioned to close off said reflux line, and during traction control operation, when the pressure of the delivery line reaches or exceeds the threshold value, said switching valve converts to an open state, whereby passage is enabled between the suction line and the master cylinder reservoir via said reflux line. and a spring contracted and set within the main brake line chamber so as to urge the first piston to close the passage between the first delivery chamber and the reflux chamber, and during non-braking periods or normal braking action, and during operation of the antilock brake circuit, said switching valve is positioned to close off said reflux line, and during traction control operation, when the pressure of the delivery line reaches or exceeds the threshold value, said switching valve converts to an open state, whereby passage is enabled between the suction line and the master cylinder reservoir via said reflux line.

11. A pressure control unit as claimed in claim 7, wherein the brake circuits connecting the master cylinder and the rear-left, rear-right, front-left, and front-right wheels are split into a front brake circuit and a rear brake circuit, and the pressure control unit is installed in the rear brake circuit which controls the rear-left and rear-right drive wheels.

12. A pressure control unit as claimed in claim 7, wherein the brake circuits connecting the master cylinder and the rear-left, rear-right, front-left, and front-right wheels are split into two diagonal brake circuits, and the pressure control unit is installed in each of the brake circuits so as to operate with braking the front-left and front-right drive wheels.

13. A pressure control unit for a brake system connected to an antilock brake circuit and a traction control system, the brake system including a master cylinder connected to brake circuits for a plurality of drive and follower wheels, each brake circuit being connected to a wheel cylinder through a main brake line, and each brake circuit includes a normally open-type inlet valve installed in the main brake line to open or close passage to the main brake line, a normally closed-type outlet valve to open or close passage between the wheel cylinder and a working fluid reservoir, a suction line that connects a suction side of a hydraulic pump connected to the working fluid reservoir, and a delivery line that connects the hydraulic pump to the main brake line on a master cylinder side from the outlet valve, the pressure control unit for the drive wheels comprising:

(a) a selector valve, fitted in the main brake line on the master cylinder side of a connection of the main brake line and the delivery line, said selector valve being formed to switch to a closed state only during traction control operation;

(b) a reflux line which connects a master cylinder reservoir and the suction line;

(c) a pressure-actuated switching valve fitted across both the main brake line and said reflux line, wherein said switching valve in any braking or traction situation allows free passage through the main brake line and during non-braking periods and during traction control operation, said switching valve opens passage through said reflux line but during normal braking periods or during operation of the antilock brake circuit, said switching valve closes said reflux line;

(d) a pressure-controlled relief valve, fitted across both the main brake line and said reflux line, wherein a first end of said relief valve is subject to pressure of the master cylinder, and a second end is subject to pressure of the delivery line, and during traction control operation, when the pressure from the delivery line reaches or exceeds a threshold level, said relief valve opens to exhaust excess hydraulic pressure of the delivery line to said reflux line, and at all other times said relief valve remains closed; and (e) a check valve fitted in the suction line on a working fluid reservoir side of a connection with said reflux line.

14. A pressure control unit as claimed in claim 13, wherein said switching valve includes a piston housed inside a cylinder, the cylinder and a first end of the piston having defined therebetween a main brake line chamber which enables passage to the main brake line, the cylinder and a second end of the piston having defined therebetween a reflux chamber which enables passage to the reflux line, said switching valve further including a valve head molded on the second end of the piston in the reflux chamber with a valve seat formed in the reflux chamber toward which the piston is urged by a spring contracted and set within the reflux chamber, wherein during non-braking periods or during traction control operation, passage through the reflux chamber to the reflux line is open, and during normal braking operation or during operation of the antilock braking system, passage through the reflux chamber to the reflux line is closed.

15. A pressure control unit as claimed in claim 13, wherein the brake circuits connecting the master cylinder and the rear-left, rear-right, front-left, and front-right wheels are split into a front brake circuit and a rear brake circuit, and the pressure control unit is installed in the rear brake circuit which controls the rear-left and rear-right drive wheels.

16. A pressure control unit as claimed in claim 13, wherein the brake circuits connecting the master cylinder and the rear-left, rear-right, front-left, and front-right wheels are split into two diagonal brake circuits, and the pressure control unit is installed in each of the brake circuits so as to operate with braking the front-left and front-right drive wheels.

17. A pressure control unit for a brake system connected to an antilock brake circuit and a traction control system, the brake system including a master cylinder connected to brake circuits for a plurality of drive and follower wheels, each brake circuit being connected to a wheel cylinder through a main brake line, and each brake circuit includes a normally open-type inlet valve installed in the main brake line to open or close passage to the main brake line, a normally closed-type outlet valve to open or close passage between the wheel cylinder and a working fluid reservoir, a suction line that connects a suction side of a hydraulic pump connected to the working fluid reservoir, and a delivery line that connects the hydraulic pump to the main brake line on a master cylinder side from the outlet valve, the pressure control unit for the drive wheels comprising:

(a) a selector valve, fitted in the main brake line on the master cylinder side of a connection of the main brake line and the delivery line, said selector valve being formed to switch to a closed state only during traction control operation;

(b) a reflux line which connects a master cylinder reservoir and the suction line;

(c) a pressure-actuated switching and relief valve unit fitted across both the main brake line and said reflux line and connected to the delivery line, wherein said valve unit in any braking or traction situation allows free passage through the main brake line and during non-braking periods and during traction control operation, said valve unit opens passage through said reflux line but during normal braking periods or during operation of the antilock brake circuit, said valve unit closes said reflux line, and during traction control operation, when the pressure from the delivery line reaches or exceeds a threshold level, said relief valve opens to exhaust excess hydraulic pressure of the delivery line to said reflux line, and at all other times said relief valve remains closed; and (e) a check valve fitted in the suction line on a working fluid reservoir side of a connection with said reflux line.

18. A pressure control unit as claimed in claim 17, wherein said valve unit includes a variable-diameter cylinder defined therein housing a ring piston positioned so as to slide back and forth within the variable-diameter cylinder and a relief valve piston slidably engaged with the ring piston so as to slide back and forth within the ring piston and the variable-diameter cylinder, the cylinder and first ends of the relief valve piston and the ring piston having defined therebetween a main brake line chamber formed to enable passage to the main brake line, while the cylinder and second ends of the relief valve piston and ring piston having defined therebetween a second chamber formed to enable passage to each of the suction line, delivery line, and reflux line, said valve unit further including a delivery line port defined on a second end of said valve unit and which enables passage to the delivery line with a second valve seat formed with the delivery line port in the cylinder, a second valve head molded onto the second end of the relief valve piston in the second chamber, a third valve seat formed on a variable-diameter section of the cylinder, a third valve head molded onto the second end of the ring piston so as to seat with the third valve seat toward the second end of said valve unit, a first spring positioned with a first end of the relief valve piston in the main brake line chamber so as to close the second valve head with the second valve seat in the second chamber, a second spring positioned with the second end of the ring piston in the second chamber so as to allow passage for the reflux line through the second chamber, wherein during periods of no braking action or during traction control operation, the ring piston opens the second chamber to enable passage to the master cylinder reservoir and the suction line and during normal braking operation or during antilock brake operation, the ring piston closes the second chamber to block passage to the master cylinder and suction line, while the relief valve piston opens the second chamber only during traction control operation to exhaust the excess hydraulic fluid from the delivery line to the reflux line.

* * * * *

UNITED STATES PATENT AND TRADEMARK OFFICE
CERTIFICATE OF CORRECTION

PATENT NO.   :   5,330,258
DATED        :   July 19, 1994
INVENTOR(S)  :   Yukio HOSOYA et al It is certified that error appears in the above-identified patent and that said Letters Patent is hereby corrected as shown below:

On the Title Page, Item [19], change " Hoshoya et al " to -- Hosoya et al --.

On the Title Page, Item [75], change " Hoshoya " to -- Hosoya --.

Signed and Sealed this

Twentieth Day of December, 1994

Attest:

BRUCE LEHMAN

Attesting Officer     Commissioner of Patents and Trademarks